US009483190B2

(12) United States Patent
Hasegawa et al.

(10) Patent No.: US 9,483,190 B2
(45) Date of Patent: *Nov. 1, 2016

(54) AVERAGE RESPONSE TIME IMPROVEMENT FROM A FILE SYSTEM FOR A TAPE LIBRARY

(71) Applicant: International Business Machines Corporation, Armonk, NY (US)

(72) Inventors: Tohru Hasegawa, Tokyo (JP); Yuhko Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,745

(22) Filed: Jan. 18, 2016

(65) Prior Publication Data

US 2016/0132255 A1 May 12, 2016

Related U.S. Application Data

(63) Continuation of application No. 14/097,417, filed on Dec. 5, 2013, now Pat. No. 9,256,370.

(51) Int. Cl.
*G06F 12/00* (2006.01)
*G06F 3/06* (2006.01)

(52) U.S. Cl.
CPC ............ *G06F 3/0611* (2013.01); *G06F 3/067* (2013.01); *G06F 3/0655* (2013.01); *G06F 3/0659* (2013.01); *G06F 3/0665* (2013.01); *G06F 3/0686* (2013.01)

(58) Field of Classification Search
CPC ... G06F 3/0611; G06F 3/0655; G06F 3/0686
See application file for complete search history.

(56) References Cited

U.S. PATENT DOCUMENTS

| 5,418,971 A | 5/1995 | Carlson |
| 6,519,678 B1 | 2/2003 | Basham et al. |
| 2011/0179222 A1 | 7/2011 | Iwasaki et al. |

FOREIGN PATENT DOCUMENTS

| JP | 2006-035618 A | 2/2006 |
| JP | 2006-052025 A | 2/2006 |
| WO | WO 2010/035617 A1 | 4/2010 |

OTHER PUBLICATIONS

U.S. Appl. No. 14/097,417, 2 pages.

*Primary Examiner* — Yong Choe
(74) *Attorney, Agent, or Firm* — Francis Lammes; Stephen J. Walder, Jr.; Randall J. Bluestone

(57) ABSTRACT

A mechanism is provided for improving the average response time of a tape library. Prior to receiving a next access request for data from one of a set of tape mediums, a determination is made as to whether a number of tape drives that are unoccupied is less than a predetermined minimum open tape drive threshold (N). Responsive to the number of tape drives that are unoccupied being less than the predetermined minimum open tape drive threshold (N), a least recently used idle tape medium is unmounted and unloaded from an associated tape drive.

20 Claims, 5 Drawing Sheets

AVERAGE RESPONSE TIME IMPROVEMENT FROM A FILE SYSTEM FOR A TAPE LIBRARY

BACKGROUND

The present application relates generally to an improved data processing apparatus and method and more specifically to mechanisms for improving the average response time from a file system for a tape library.

Linear Tape File System (LTFS) a file system for tape media storage and Linear Tape File System Library Edition (LTFS LE) is a file system for tape library. In general, when a tape library is used for tape silo mass storage applications, the number of tape media is large as compared with the number of tape drives that read the tape media. Thus, each tape drive is shared by a plurality of tape media, where a tape media is inserted (mounted) into a tape drive when a need for accessing data from a particular tape medium arises and the tape media is ejected (unmounted) from the tape drive when accessing data from that tape media becomes unnecessary, thereby enabling shared use of the tape drive.

SUMMARY

In one illustrative embodiment, a method, in a data processing system, is provided for improving the average response time of a tape library. The illustrative embodiment determining whether a number of tape drives that are unoccupied is less than a predetermined minimum open tape drive threshold (N) prior to receiving a next access request for data from one of a set of tape mediums. The illustrative embodiment unmounts and unloads a least recently used idle tape medium from an associated tape drive in response to the number of tape drives that are unoccupied being less than the predetermined minimum open tape drive threshold (N).

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

When a tape library is used in Hierarchical Storage Management (HSM), backup, or the like, for an exclusive-use application such as IBM®'s Tivoli Storage Manager (TSM), both a point in time at which access becomes necessary (for example, at the time of the start of backup) and a point in time at which the access becomes unnecessary (for example, at the time of the end of backup) are clear. For this reason, there is no problem with mounting or unmounting a tape media.

However, in an event where a tape library is used with the use of a file system interface as in Linear Tape File System Library Edition (LTFS LE), identifying when accesses by a certain particular application may not be possible to anticipate. That is, in some events, a point in time at which an access to a tape media starts and a point in time at which the access to the tape media ends may not be clear.

One current solution to anticipating access to a tape media is in LTFS LE where file metadata information (file name, timestamp, etc.) in all of tape media that have ever been mounted are cached in a memory associated with accessing an application. Then, for example, only when a creation of a file, an update to a file, a reading of a file, or the like, is performed, does the LTFS LE actually mount the tape media to access the file itself. By this means, in the example described above, LTFS LE does not mount a tape media when the file is simply browsed.

In addition, in LTFS LE, when access to a certain file ends, LTFS LE keeps the tape media mounted instead of immediately unmounting the tape media. This is because it is empirically known that, immediately after the end of an access to a tape media, the probability of the occurrence of an access to this same tape media in a consecutive manner is high. In a case where an access to data in another tape media occurs, the other tape media is loaded and mounted with the use of another tape drive. However, if all tape drives have tape media mounted, current LTFS LE implementations execute an algorithm that is based on Least Recently Used (LRU) to select a tape medium to unmount. Only after LTFS LE unmounts the identified tape media, does LTFS LE mount the needed tape media for access. For this reason, the delay in accessing data on a tape media occurs when tape media are left mounted until another tape media is needed.

Therefore, the illustrative embodiments provide a mechanism whereby a certain number of unoccupied tape drives are always kept ready and available so as to increase an average response speed. That is, a certain number of tape drives are kept in a state where tape media is not mounted as long as there is no immediate need for a tape media to be mounted.

Figure 1:
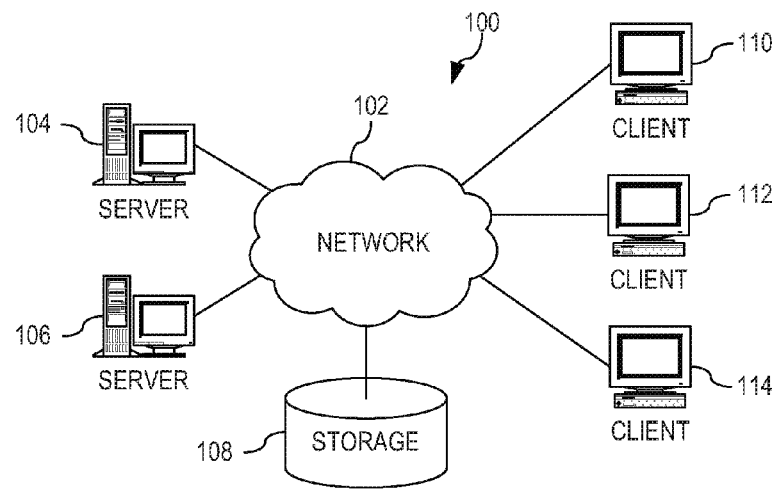
FIG. 1 is an example diagram of a distributed data processing system in which aspects of the illustrative embodiments may be implemented.
Figure 2:
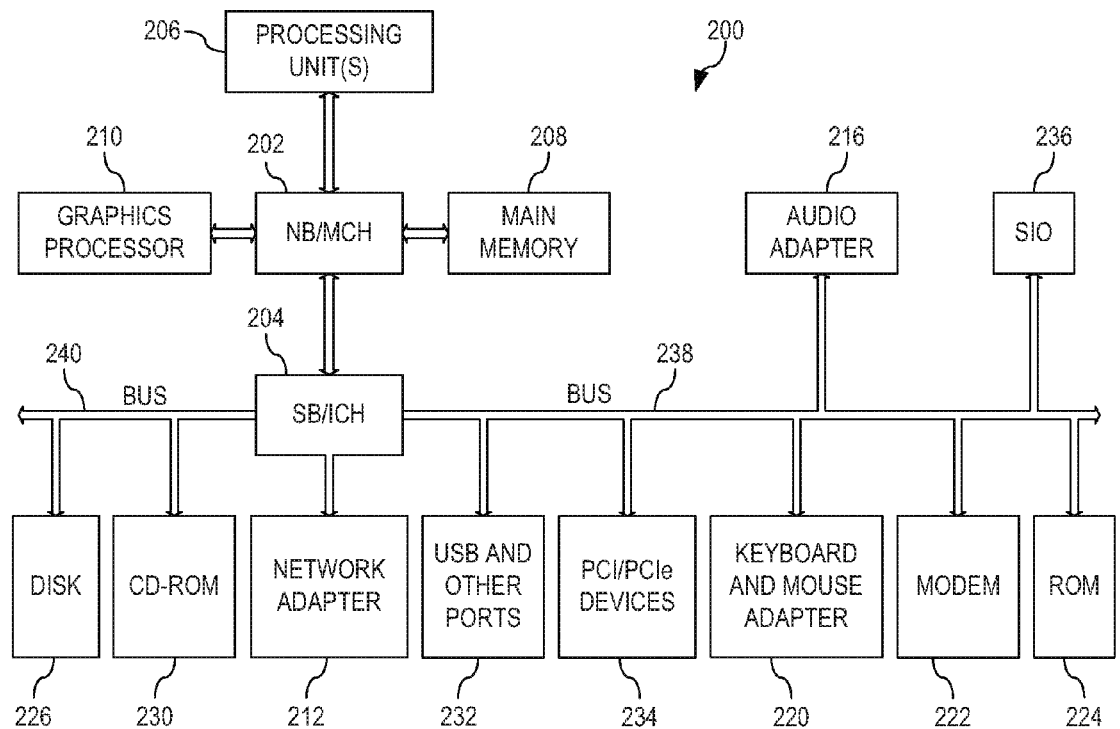
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
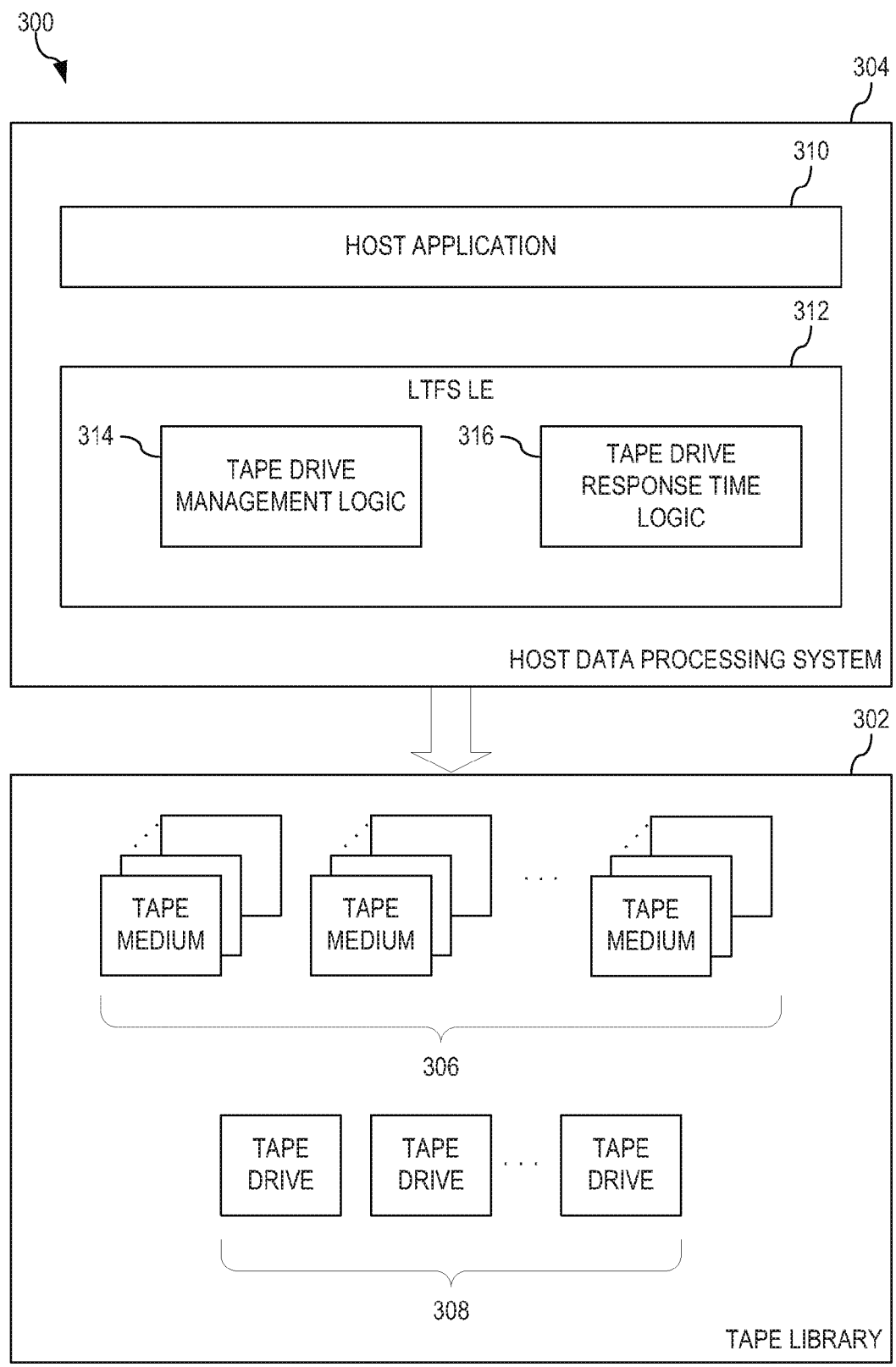
FIG. 3 depicts a functional block diagram for a tape drive response time mechanism in accordance with an illustrative embodiment.

FIG. 3 depicts a functional block diagram for a tape drive response time mechanism in accordance with an illustrative embodiment. Data processing system 300 comprises tape library 302 and host data processing system 304. Tape library 302 comprises a set of tape mediums 306 and a set of tape drives 308. Host data processing system 304 comprises one or more host applications 310, which may access tape library 302 via Linear Tape File System Library Edition (LTFS LE) 312, which comprises tape drive management logic 314 and tape drive response time logic 316. Both tape library 302 and each of the set of tape drives 308 comprises firmware of a processor and a memory, which is coupled to the processor, comprising instructions that, when executed by the processor, cause the process to perform various operations.

In operation, when tape drive management logic 314 receives an access request from host application 310, tape drive management logic 314 determines whether a particular one of the set of tape mediums 306 identified by the access request is already mounted in one of the set of tape drives 308. If tape drive management logic 314 determines that the particular one of the set of tape mediums 306 identified by the access request is already mounted in one of the set of tape drives 308, tape drive management logic 314 performs the access request on the particular one of the set of tape mediums 306 already mounted in one of the set of tape drives 308.

If tape drive management logic 314 determines that the particular one of the set of tape mediums 306 identified by the access request is not already mounted in one of the set of tape drives 308, tape drive management logic 314 determines whether one of tape drives 308 is unoccupied. If tape drive management logic 314 determines that one of tape drives 308 is unoccupied, tape drive management logic 314 loads and mounts the particular one of tape medium 306 identified by the access request in order to access to the requested data.

If tape drive management logic 314 determines that all of tape drives 308 are occupied with one of the sets of tape mediums 306, tape drive management logic 314 determines whether all of the tape drives are busy with other access requests. If tape drive management logic 314 determines that all of the tape drives are busy with other access requests, tape drive management logic 314 waits until one of tape drives 308 becomes idle upon which, when one tape drive 308 becomes idle, tape drive management logic 314 unmounts and unloads the tape drive and loads and mounts the particular one of tape medium 306 identified by the access request. If tape drive management logic 314 determines that not all of the tape drives are busy with other access requests but are occupied, tape drive management logic 314 unmounts and unloads the least recently used tape medium 306 from its associated tape drive 308 and loads and mounts the particular one of tape medium 306 identified by the access request.

However, with all tape drives 308 occupied with an associated one of tape medium 306, tape drive management logic 314 does not unmount any idle tape medium 306 from tape drive 308 unless there is a pending access request. In accordance with the illustrative embodiments, if one of tape drives 308 were to become idle, regardless of whether an access request is pending or not, tape drive response time logic 316 ensures that one or more of tape drives 308 are unoccupied. That is, tape drive response time logic 316 determines whether a number of tape drives that are unoccupied is less than a predetermined minimum open tape drive threshold. If tape drive response time logic 316 determines that the number of tape drives that are unoccupied is less than a predetermined minimum open tape drive threshold, tape drive response time logic 316 unmounts and unloads the next least recently used idle tape medium 306. If tape drive response time logic 316 determines that the number of tape drives that are unoccupied is greater than or equal to the predetermined minimum open tape drive threshold, tape drive response time logic 316 continues to monitor the tape drives 308.

A user may manually set a predetermined minimum open tape drive threshold value N at the time of startup in such a way as to ensure that a mathematical relationship/condition expressed in the equation below is satisfied. Alternatively, tape drive response time logic 316 may statistically acquire average mounting time, etc. and perform calculations, thereby automatically setting the predetermined minimum open tape drive threshold value in such a way as to ensure that the following equation hold true:

$$(M-D)(TU+TD) > N*(TL+TM)$$

where M is a number of tape medium 306, D is a number of tape drives 308, TL is an average loading time, TU is an average unloading time, TM is an average mounting time, TD is an average unmounting time, TA is an average data access time, and N is the predetermined minimum open tape drive threshold value.

That is, utilizing only tape drive management logic 314, a probability that a target tape medium 306 is already mounted in any one of tape drives 308 is D/M and the average time required by tape drive management logic 314 to access a target tape medium 306 that is not in any one of the set of tape drives 308 is TU+TD+TL+TM. Thus, tape drive management logic's 314 required time to respond to an access request may be identified by the following equation:

$$(D/M) \times TA + (1-D/M)(TU+TD+TL+TM+TA).$$

However, in accordance with the illustrative embodiments, tape drive response time logic 316 unmounts and unloads at least one idle tape medium 306 from at least one tape drive 308 in advance so as to keep a number of unoccupied tape drives 308 ready and available. Therefore, utilizing tape drive response time logic 316 the probability that the target medium is in any drive is reduced to (D−N)/M and the average time required by tape drive response time logic 316 to access a target tape medium 306 in any one of the set of tape drives 308 is (TL+TM). Therefore, tape drive response time logic's 316 required time to respond to an access request may be identified by the following equation:

$$((D-N)/M) \times TA + (1-(D-N)/M)(TL+TM+TA).$$

Thus, tape drive response time logic 316 shortens the average access time on the precondition that a number of unoccupied drives are kept ready and available. That is, the required time to respond to an access request utilizing tape drive management logic 314 is greater than the required time to respond to an access request utilizing tape drive response time logic 316 as is expressed in the following equation:

$$(D/M) \times TA + (1-D/M)(TU+TD+TL+TM+TA) > ((D-N)/M) \times TA + (1-(D-N)/M)(TL+TM+TA).$$

This equation may be simplified to:

$$(M-D)(TU+TD) > N \times (TL+TM).$$

Thus, it is possible to shorten average access time by tape drive response time logic 316 keeping a number of unoccupied tape drives 308 ready and available by identifying the predetermined minimum open tape drive threshold value N, in such a way as to satisfy:

$$(M-D)(TU+TD) > N \times (TL+TM).$$

As an example, if the average loading time (TL) were 22.00 seconds, the average unloading time (TU) were 17.64 seconds, the average mounting time (TM) were 3.68 seconds, and the average unmounting time (TD) were 74.98 seconds, then $$(M-D) \times 92.62 > N \times 25.68.$$

Thus, if M>D, N=1 would satisfy the above equation.

Figure 4A:
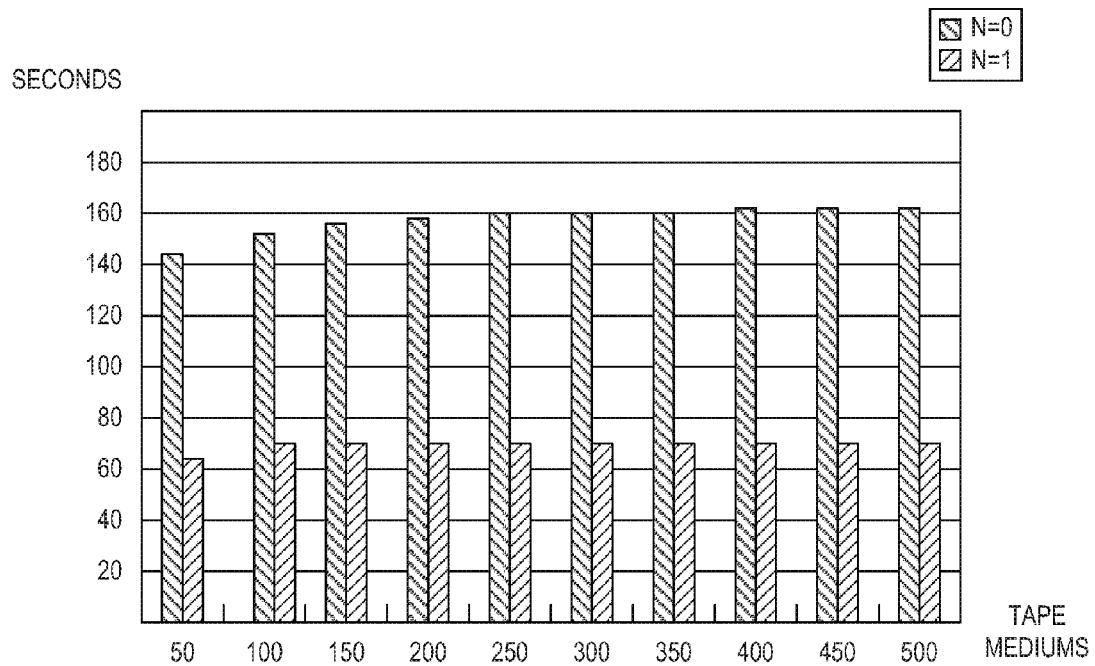
FIGS. 4A and 4B illustrate exemplary average access times in a tape library in accordance with an illustrative embodiment.
Figure 4B:
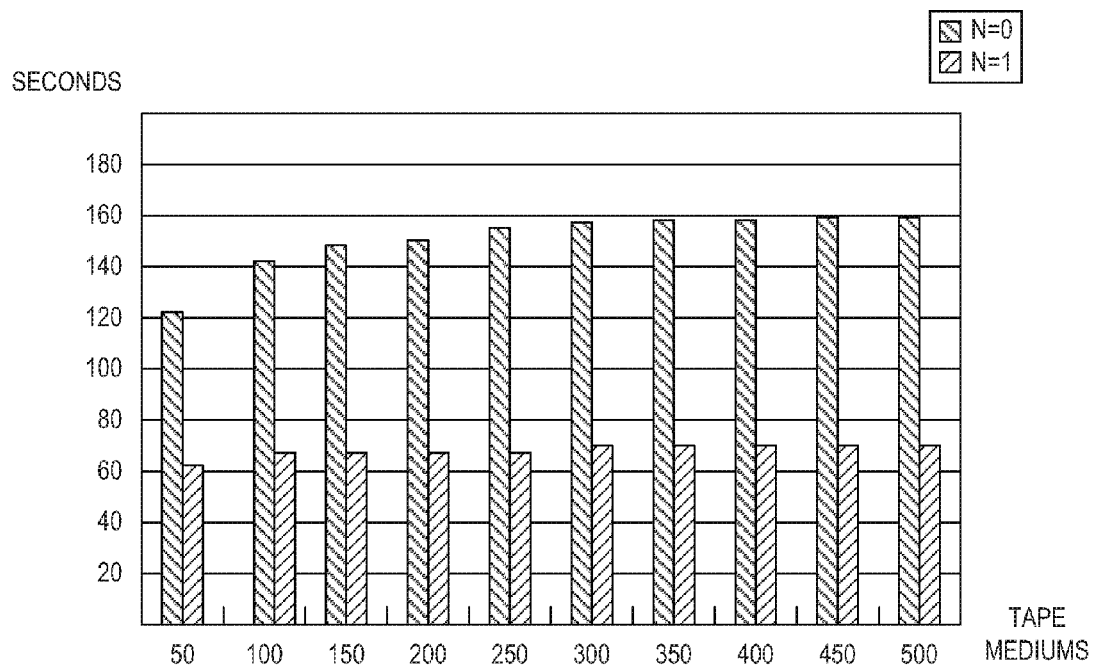

FIGS. 4A and 4B illustrate exemplary average access times in a tape library in accordance with an illustrative embodiment. FIG. 4A illustrates exemplary average access times in a tape library where eight tape drives with 50 to 500 (50, 100, 150, 200, 250, 300, 350, 400, 450, and 500) tape media are used under the assumption of the occurrence of random accesses occur. FIG. 4B illustrates an exemplary average access times in a tape library where 16 tape drives with 50 to 500 (50, 100, 150, 200, 250, 300, 350, 400, 450, and 500) tape media are used. As is shown in in both of these figures, access times are higher when no (N=0) predetermined minimum open tape drive threshold value N is specified as compared with the access time when the predetermined minimum open tape drive threshold value is set to 1 (N=1).

Thus, as will be understood from the illustrated exemplary results, the illustrative tape drive response time logic shortens the average access time regardless of the number of tape drives. That is, in the case of the minimum access time reduction, which is a case where 16 tape drives with 50 tape cartridges are used, the result shows a 49% reduction. In the case of the maximum access time reduction, which is a case where eight tape drives with 500 tape cartridges are used, the result shows a 57% reduction.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
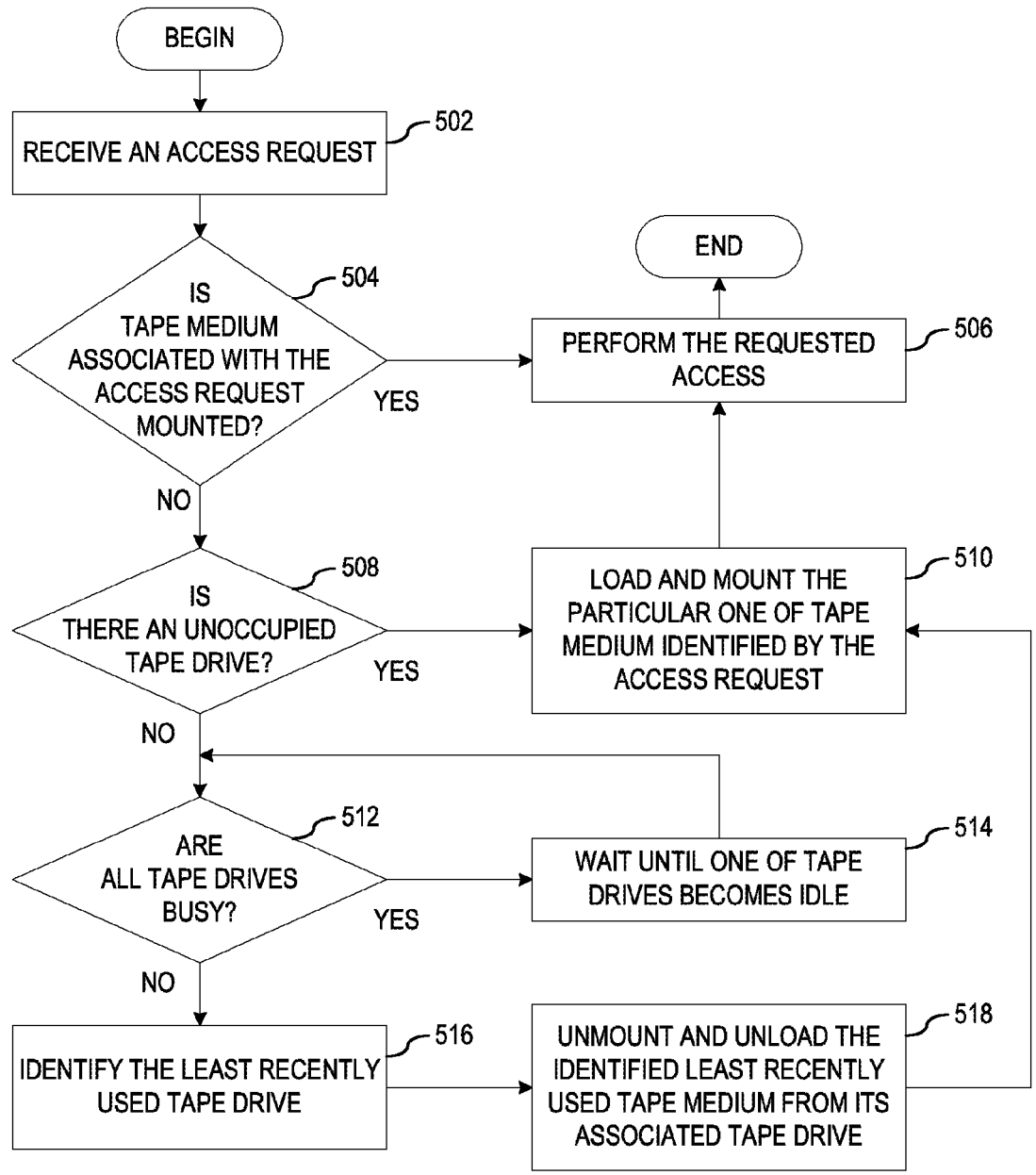
FIG. 5 depicts a flowchart of the operation performed by tape drive management logic of a tape library in accordance with an illustrative embodiment.

FIG. 5 depicts a flowchart of the operation performed by tape drive management logic of a tape library in accordance with an illustrative embodiment. As the operation begins, the tape drive management logic receives an access request from a host application (step 502). The tape drive management logic determines whether a particular one of the set of tape mediums identified by the access request is already mounted in one of the set of tape drives (step 504). If at step 504 the tape drive management logic determines that the particular one of the set of tape mediums identified by the access request is already mounted in one of the set of tape drives, the tape drive management logic performs the access request on the particular one of the set of tape mediums already mounted in one of the set of tape drives (step 506), with the operation ending thereafter.

If at step 504 the tape drive management logic determines that the particular one of the set of tape mediums identified by the access request is not already mounted in one of the set of tape drives, the tape drive management logic determines whether one of tape drives is unoccupied (step 508). If at step 508 the tape drive management logic determines that one of tape drives is unoccupied, the tape drive management logic loads and mounts the particular one of tape mediums identified by the access request (step 510), with the operation proceeding to step 506 thereafter.

If at step 508 the tape drive management logic determines that all of tape drives are occupied with one of the sets of tape mediums, the tape drive management logic determines whether all of the tape drives are busy with other access requests (step 512). If at step 512 the tape drive management logic determines that all of the tape drives are busy with other access requests, the tape drive management logic waits until one of tape drives becomes idle (step 514), with the operation returning to step 512. If at step 512 the tape drive management logic determines that not all of the tape drives are busy with other access requests but are occupied, the tape drive management logic identifies the least recently used tape drive (step 516) and unmounts and unloads the identified least recently used tape medium from its associated tape drive (step 518), with the operation proceeding to step 510 thereafter.

Figure 6:
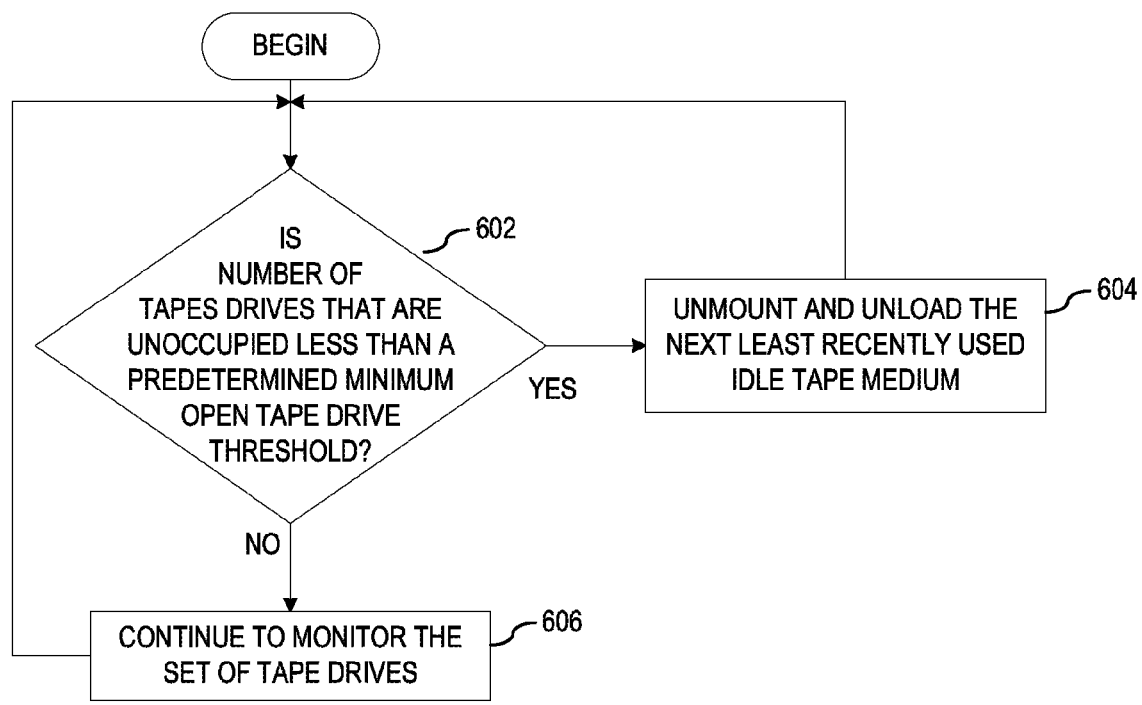
FIG. 6 depicts a flowchart of the operation performed by tape drive response time logic of a tape library in accordance with an illustrative embodiment.

However, in order to negate the operations performed by tape drive management logic in steps 516 and 518 when the tape drive management logic determines that not all of the tape drives are busy accessing other data but are occupied, FIG. 6 depicts a flowchart of the operation performed by tape drive response time logic of a tape library in accordance with an illustrative embodiment. As the operation begins, the tape drive response time logic determines whether a number of tape drives that are unoccupied is less than a predetermined minimum open tape drive threshold (step 602). If at step 602 the tape drive response time logic determines that number of tape drives that are unoccupied is less than a predetermined minimum open tape drive threshold, the tape drive response time logic unmounts and unloads the next least recently used idle tape medium (step 604), with the operation returning to step 602 thereafter. If at step 602 the tape drive response time logic determines that the number of tape drives that are unoccupied is greater than or equal to the predetermined minimum open tape drive threshold, the tape drive response time logic continues to monitor the set of tape drives (step 606), with the operation returning to step 602 thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, to solve the issue where tape drive management logic does not unmounts and unload idle tape mediums from tape drive unless there is a pending access request, the illustrative embodiments provide mechanism for, regardless of whether an access request is pending or not, ensuring that one or more tape drives are unoccupied if the tape drives are not busy accessing other data for other host applications.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for improving the average response time of a tape library, the method comprising:
   prior to receiving a next access request for data from one of a set of tape mediums, determining whether a number of tape drives that are unoccupied is less than a predetermined minimum open tape drive threshold (N);
   responsive to the number of tape drives that are unoccupied being less than the predetermined minimum open tape drive threshold (N) and no tape medium being idle, waiting for a tape medium to become idle; and
   responsive to the tape medium becoming idle, unmounting and unloading a least recently used idle tape medium from its associated tape drive.

2. The method of claim 1, wherein the predetermined minimum open tape drive threshold (N) is determined by satisfying the following equation:

$(M-D)(TU+TD) > N \times (TL+TM)$, where M is the number of tape mediums in the tape library, D is a number of tape drives in the tape library, TL is an average loading time of a tape medium in the set of tape mediums, TU is an average unloading time of a tape medium in the set of tape mediums, TM is an average mounting time of a tape medium in the set of tape mediums, TD is an average unmounting time of a tape medium in the set of tape mediums, and N is the predetermined minimum open tape drive threshold, wherein the average loading time (TL), the average unloading time (TU), the average mounting time (TM), and the average unmounting time (TD) are all in a time measurement of seconds.

3. The method of claim 1, further comprising:
   responsive to receiving the next access request for data from a tape medium in the set of tape mediums, determining whether a tape medium identified with the next access request is already mounted in one of the set of tape drives; and
   responsive to the tape medium identified with the next access request already being mounted in one of the set of tape drives, performing the next access request.

4. The method of claim 3, further comprising:
   responsive to the tape medium identified with the next access request failing to already be mounted in one of the set of tape drives, determining whether there is an unoccupied tape drive in the set of tape drives;
   responsive to determining that there is no unoccupied tape drive in the set of tape drives, waiting for a tape medium to become idle;
   responsive to a tape drive becoming idle, unmounting and unloading a current tape medium mounted in the tape drive; and
   loading and mounting the tape medium in the set of tape mediums identified with the next access request.

5. The method of claim 3, further comprising:
   responsive to the tape medium identified with the next access request failing to already be mounted in one of the set of tape drives, determining whether there is an unoccupied tape drive in the set of tape drives; and
   responsive to determining that there is an unoccupied tape drive in the set of tape drives, loading and mounting the tape medium in the set of tape mediums identified with the next access request.

6. The method of claim 1, wherein the tape library is a Linear Tape File System Library Edition (LTFS LE) files system operated tape library.

7. The method of claim 1, further comprising
   responsive to the number of tape drives that are unoccupied being less than the predetermined minimum open tape drive threshold (N) and a tape medium being idle, unmounting and unloading a least recently used idle tape medium from an associated tape drive.

8. A computer program product comprising a computer readable storage medium having a computer readable program stored therein, wherein the computer readable program, when executed on a computing device, causes the computing device to:
   prior to receiving a next access request for data from one of a set of tape mediums, determine whether a number of tape drives that are unoccupied is less than a predetermined minimum open tape drive threshold (N);
   responsive to the number of tape drives that are unoccupied being less than the predetermined minimum open tape drive threshold (N) and no tape medium being idle, wait for a tape medium to become idle; and
   responsive to the tape medium becoming idle, unmount and unload a least recently used idle tape medium from its associated tape drive.

9. The computer program product of claim 8, wherein the predetermined minimum open tape drive threshold (N) is determined by satisfying the following equation:

$(M-D)(TU+TD) > N \times (TL+TM)$, where M is the number of tape mediums in the tape library, D is a number of tape drives in the tape library, TL is an average loading time of a tape medium in the set of tape mediums, TU is an average unloading time of a tape medium in the set of tape mediums, TM is an average mounting time of a tape medium in the set of tape mediums, TD is an average unmounting time of a tape medium in the set of tape mediums, and N is the predetermined minimum open tape drive threshold, wherein the average loading time (TL), the average unloading time (TU), the average mounting time (TM), and the average unmounting time (TD) are all in a time measurement of seconds.

10. The computer program product of claim 8, wherein the computer readable program further causes the computing device to:
  responsive to receiving the next access request for data from a tape medium in the set of tape mediums, determine whether a tape medium identified with the next access request is already mounted in one of the set of tape drives; and
  responsive to the tape medium identified with the next access request already being mounted in one of the set of tape drives, perform the next access request.

11. The computer program product of claim 10, wherein the computer readable program further causes the computing device to:
  responsive to the tape medium identified with the next access request failing to already be mounted in one of the set of tape drives, determine whether there is an unoccupied tape drive in the set of tape drives;
  responsive to determining that there is no unoccupied tape drive in the set of tape drives, wait for a tape medium to become idle;
  responsive to a tape drive becoming idle, unmount and unload a current tape medium mounted in the tape drive; and
  load and mount the tape medium in the set of tape mediums identified with the next access request.

12. The computer program product of claim 10, wherein the computer readable program further causes the computing device to:
  responsive to the tape medium identified with the next access request failing to already be mounted in one of the set of tape drives, determine whether there is an unoccupied tape drive in the set of tape drives; and
  responsive to determining that there is an unoccupied tape drive in the set of tape drives, load and mount the tape medium in the set of tape mediums identified with the next access request.

13. The computer program product of claim 8, wherein the tape library is a Linear Tape File System Library Edition (LTFS LE) files system operated tape library.

14. The computer program product of claim 8, wherein the computer readable program further causes the computing device to:
  responsive to the number of tape drives that are unoccupied being less than the predetermined minimum open tape drive threshold (N) and a tape medium being idle, unmount and unload a least recently used idle tape medium from an associated tape drive.

15. An apparatus comprising:
  a processor; and
  a memory coupled to the processor, wherein the memory comprises instructions which, when executed by the processor, cause the processor to:
  prior to receiving a next access request for data from one of a set of tape mediums, determine whether a number of tape drives that are unoccupied is less than a predetermined minimum open tape drive threshold (N);
  responsive to the number of tape drives that are unoccupied being less than the predetermined minimum open tape drive threshold (N) and no tape medium being idle, wait for a tape medium to become idle; and
  responsive to the tape medium becoming idle, unmount and unload a least recently used idle tape medium from its associated tape drive.

16. The apparatus of claim 15, wherein the predetermined minimum open tape drive threshold (N) is determined by satisfying the following equation:

$$(M-D)(TU+TD) > N \times (TL+TM),$$

where M is the number of tape mediums in the tape library, D is a number of tape drives in the tape library, TL is an average loading time of a tape medium in the set of tape mediums, TU is an average unloading time of a tape medium in the set of tape mediums, TM is an average mounting time of a tape medium in the set of tape mediums, TD is an average unmounting time of a tape medium in the set of tape mediums, and N is the predetermined minimum open tape drive threshold, wherein the average loading time (TL), the average unloading time (TU), the average mounting time (TM), and the average unmounting time (TD) are all in a time measurement of seconds.

17. The apparatus of claim 15, wherein the instructions further cause the processor to:
  responsive to receiving the next access request for data from a tape medium in the set of tape mediums, determine whether a tape medium identified with the next access request is already mounted in one of the set of tape drives; and
  responsive to the tape medium identified with the next access request already being mounted in one of the set of tape drives, perform the next access request.

18. The apparatus of 17, wherein the instructions further cause the processor to:
  responsive to the tape medium identified with the next access request failing to already be mounted in one of the set of tape drives, determine whether there is an unoccupied tape drive in the set of tape drives;
  responsive to determining that there is no unoccupied tape drive in the set of tape drives, wait for a tape medium to become idle;
  responsive to a tape drive becoming idle, unmount and unload a current tape medium mounted in the tape drive; and
  load and mount the tape medium in the set of tape mediums identified with the next access request.

19. The apparatus of claim 17, wherein the instructions further cause the processor to:
  responsive to the tape medium identified with the next access request failing to already be mounted in one of the set of tape drives, determine whether there is an unoccupied tape drive in the set of tape drives; and
  responsive to determining that there is an unoccupied tape drive in the set of tape drives, load and mount the tape medium in the set of tape mediums identified with the next access request.

20. The apparatus of claim 15, wherein the instructions further cause the processor to:
  responsive to the number of tape drives that are unoccupied being less than the predetermined minimum open tape drive threshold (N) and a tape medium being idle, unmount and unload a least recently used idle tape medium from an associated tape drive.

* * * * *